United States Patent
Yazawa et al.

(10) Patent No.: US 7,438,475 B2
(45) Date of Patent: Oct. 21, 2008

(54) BEARING UNIT, AND MOTOR AND ELECTRONIC EQUIPMENT, BOTH EQUIPPED WITH THE BEARING UNIT

(75) Inventors: Kenichiro Yazawa, Tokyo (JP); Takeshi Kaneko, Chiba (JP); Kiyoyuki Takada, Chiba (JP); Yoshiaki Kakinuma, Tokyo (JP); Hiroshi Sato, Chiba (JP); Yuji Shishido, Kanagawa (JP)

(73) Assignee: Sony Corporation (JP)

( * ) Notice: Subject to any disclaimer, the term of this patent is extended or adjusted under 35 U.S.C. 154(b) by 338 days.

(21) Appl. No.: 10/969,062

(22) Filed: Oct. 21, 2004

(65) Prior Publication Data
US 2005/0163405 A1 Jul. 28, 2005

(30) Foreign Application Priority Data
Nov. 14, 2003 (JP) ............................ P2003-385547

(51) Int. Cl.
*F16C 32/06* (2006.01)
(52) U.S. Cl. ........................................ 384/107; 384/903
(58) Field of Classification Search ......... 384/107–124, 384/903, 100; 310/90; 417/354, 423.12, 417/423.13; 360/99.08, 98.07
See application file for complete search history.

(56) References Cited

U.S. PATENT DOCUMENTS 3,663,849 A * 5/1972 Heob ........................... 310/90
6,832,853 B2 * 12/2004 Fujinaka ....................... 384/100

FOREIGN PATENT DOCUMENTS

| JP | 05-087126 | 4/1993 |
| JP | 2003-130043 | 5/2003 |
| JP | 2003-130043 A | 5/2003 |
| WO | WO 02/10602 A1 * | 2/2002 |

OTHER PUBLICATIONS

Japanese Office Action; Application No. 2003-385547; Dated: Apr. 10, 2007.

* cited by examiner

*Primary Examiner*—Thomas R Hannon
(74) *Attorney, Agent, or Firm*—Rader Fishman & Grauer PLLC; Ronald P. Kananen

(57) ABSTRACT

A bearing unit comprises a shaft, a radial bearing for supporting the shaft in a peripheral rotation direction of the shaft, a thrust bearing supporting an end of the shaft in a thrust direction of the shaft, a housing made of a molded body of a synthetic resin, inside of which housing the radial bearing and the thrust bearing are arranged, the housing having a sealed configuration except for a shaft insertion hole, through which the shaft is inserted, a slip-out preventing member provided on an end side of the radial bearing at which the thrust bearing is provided, the slip-out preventing member preventing the shaft from slipping out from the radial bearing, and a viscous fluid filled in the housing. The slip-out preventing member is made of a material having a thermal deformation temperature higher than a temperature applied to the slip-out preventing member upon molding of the housing.

24 Claims, 12 Drawing Sheets

RELATED ART

RELATED ART

ND MOTOR AND
BEARING UNIT, AND MOTOR AND ELECTRONIC EQUIPMENT, BOTH EQUIPPED WITH THE BEARING UNIT

CROSS REFERENCES TO RELATED APPLICATIONS

The present document is based on Japanese Priority Document JP 2003-385547, filed in the Japanese Patent Office on Nov. 14, 2003, the entire contents of which being incorporated herein by reference.

BACKGROUND OF THE INVENTION

1. Field of the Invention

The present invention relates to a bearing unit supporting a rotation shaft rotatably, or supporting a rotation body rotatably to a shaft, and a motor and electronic equipment, both equipped with the bearing unit.

2. Description of Related Art

As a bearing unit supporting a rotation shaft rotatably, a bearing unit constituted as shown in FIG. 19 is conventionally known.

A bearing unit 100 shown in FIG. 19 is one supporting a rotation shaft 101 rotatably, and is equipped with a radial bearing 104 for supporting the rotation shaft 101 in its peripheral rotation direction, and a housing 105 housing the radial bearing 104.

In the bearing unit 100, the radial bearing 104 constitutes a fluid dynamic bearing together with a lubricating oil being a viscous fluid filled in the housing 105, and dynamic pressure generation grooves 111 for generating a dynamic pressure are formed on an inner peripheral surface, in which the rotation shaft 101 is inserted.

As shown in FIG. 19, the housing 105 having accommodated therein the radial bearing 104 supporting the rotation shaft 101 has a shape accommodating the radial bearing 104 shaped in a cylinder in a manner surrounding the radial bearing 104, and the housing 105 is a member formed by molding a synthetic resin integrally.

The housing 105 is composed of a housing main body 106 shaped in a cylinder and a bottom sealing portion 107 constituting one end side portion formed integrally with the housing main body 106 for sealing the end side of the housing main body 106. On the opened other end side of the housing main body 106, an upper sealing portion 108 is provided. The housing 105 and the upper sealing portion 108 are integrated to be one body by means of a method such as heat welding or ultrasonic welding.

A shaft insertion hole 109, through which the rotation shaft 101 supported rotatably by the radial bearing 104 housed in the housing 105 is inserted, is formed at the central part of the upper sealing portion 108. A thrust bearing 110 for rotatably supporting a bearing supporting portion 102 is integrally formed at the central part on an inner surface side of the bottom sealing portion 107. The bearing supporting portion 102 is formed at one end of the rotation shaft 101, which is supported by the radial bearing 104, in a thrust direction.

The thrust bearing 110 is formed as a pivot bearing supporting the bearing supporting portion 102 of the rotation shaft 101 at a point. The bearing supporting portion 102 is formed in an arc or a tapered tip.

A slip-out preventing member 115, such as a washer, is provided between the bearing supporting portion 102 and a shaft main body 103. The slip-out preventing member 115 prevents the rotation shaft 101 from slipping out of the housing 105. The slip-out preventing member 115 is made of polyoxymethylene (POM), polyslider, nylon or the like.

Now, the shaft insertion hole 109 is formed to have an inner diameter larger than the outer shape of the shaft main body 103 in some degree in order that the rotation shaft 101 inserted into the shaft insertion hole 109 may rotate without contacting with an inner peripheral surface of the shaft insertion hole 109 slidably. In this case, the shaft insertion hole 109 is formed to have a gap 112 of a space x5 sufficient for preventing leakage of a lubricating oil 113 filled in the housing between the inner peripheral surface of the shaft insertion hole 109 and an outer peripheral surface of the shaft main body 103 from the inside of the housing 105.

A tapered portion 114 is formed on an outer peripheral surface of the rotation shaft 101 opposed to the inner peripheral surface of the shaft insertion hole 109. The tapered portion 114 inclines in a manner of enlarging the gap 112 formed between the outer peripheral surface of the rotation shaft 101 and the inner peripheral surface of the shaft insertion hole 109 toward the outside of the housing 105. The tapered portion 114 forms a pressure gradient in the gap 112 formed between the outer peripheral surface of the rotation shaft 101 and the inner peripheral surface of the shaft insertion hole 109, and a force draws the lubricating oil 113 filled in the housing 105 into the inside of the housing 105. Because the lubricating oil 113 is drawn in the inside of the housing 105 at the rotation of the rotation shaft 101, the lubricating oil 113 surely permeates the dynamic pressure generation grooves 111 of the radial bearing 104 made as a fluid dynamic bearing to generate a dynamic pressure. Thereby, stable support of the rotation shaft 101 is realized, and leakage of the lubricating oil 113 filled in the housing 105 can be prevented.

The bearing unit 100 configured as shown in FIG. 19 exposes the rotation shaft 101 only at one end on the side of the shaft insertion hole 109, and covers the whole bearing unit 100 by the housing member seamlessly except for a small gap of the shaft insertion hole 109. Consequently, the bearing unit 100 can prevent leakage of the lubricating oil 113 to the outside of the housing 105. Moreover, because the communicating portion to the outside is only the gap of the shaft insertion hole 109, scattering of the lubricating oil due to an impact can be prevented. Furthermore, the bearing unit 100 can prevent the rotation shaft 101 from falling off from the housing 105 by the slip-out preventing member 115.

However, because the above-mentioned bearing unit 100 is configured to surround the circumference of the bearing main body by means of two parts of the housing 105 and the upper sealing portion 108, there is the possibility that lubricating oil can ooze out from a joint portion of the housing 105 and the upper sealing portion 108.

In another case, a bearing unit has the housing thereof integrally formed by means of a molded body of a synthetic resin for preventing the oozing of the lubricating oil from the joint portion of the housing.

As shown in FIG. 20, the rotation shaft 101 is inserted into the radial bearing 104, and the slip-out preventing member 115 is attached to the side of the bearing supporting portion 102 of the inserted rotation shaft 101 in this bearing unit. Then, a space forming member 116 is attached to the side of the bearing supporting portion 102 of the radial bearing 104, and thereby the bearing unit is temporarily assembled.

Next, the temporarily assembled rotation shaft 101, the radial bearing 104 and the space forming member 116 are attached to a die. Then, as shown in FIG. 21, any one of the above-mentioned synthetic resins is outsert molded on the outer circumferences of the temporary assembled rotation shaft 101, the radial bearing 104 and the space forming member 116 to form a housing 117.

After the formation of the housing 117, the lubricating oil 113 is filled in the housing 117 to form a bearing unit 120 shown in FIG. 22.

However, in the above-mentioned bearing unit 120, the thickness of a sealing portion forming member 118 of the die is limited as shown in FIG. 21. That is to say, there is the possibility that the space x5 of the gap 112 of the bearing unit 120 formed by means of the die becomes too large, and the lubricating oil 113 leaks from the gap 112 to make it impossible to obtain good rotation performance.

Moreover, the temperature of the die at the time of the outsert molding of the housing 117 shown in FIG. 21 is 60-100° C., and the temperature of the resin is 200° C. The heat of the molding temperature conducts to the slipout preventing member 115 through the radial bearing 104 and the space forming member 116, and consequently the temperature of the slip-out preventing member 115 is raised to about 120° C. There is the possibility of the thermal deformation of the slip-out preventing member 115 owing to the rise of the temperature.

The sizes of the slip-out preventing member 115 are determined in order to form a gap x3 between the space forming member 116 and the slip-out preventing member 115 and a gap x4 between the slip-out preventing member 115 and the shaft 110 for keeping the rotation performance of the shaft. In the aforementioned deformed slip-out preventing member 115 owing to the temperature rise, the gaps x3 and x4 provided for keeping the rotation performance are changed to cause a defect in rotation by a contact of the slip-out preventing member 115 with the rotation shaft. Consequently, there is the possibility that good rotation performance cannot be obtained.

Moreover, as a variation of the above-mentioned bearing unit 120, there is a method of performing the outsert molding of the housing without inserting the shaft at the step of temporary assembly, and then of inserting the rotation shaft after molding. In this bearing unit, it is possible to adjust the space x5 of the gap 112 to be a suitable magnitude, but a defect in which the rotation shaft cannot be inserted owing to a deformation of the slip-out preventing member 115 caused by the temperature at the outsert molding and consequently the bearing unit cannot be assembled in a suitable state, or the like is generated.

[Patent Document 1]
Japanese Patent Application Publication (KOKAI) No. 2003-130043

SUMMARY OF THE INVENTION

It is an object of the present invention to prevent thermal deformation of a slip-out preventing member caused by the heat generated at the time of molding a housing.

Moreover, it is another object of the present invention to provide a bearing unit preventing the deterioration of rotation performance caused by the contact of a slip-out preventing member with a rotation shaft owing to the thermal deformation of the slip-out preventing member, and a motor and electronic equipment, both including the bearing unit.

Moreover, it is a further object of the present invention to provide a bearing unit preventing the impossibility of assembling a shaft and a slip-out preventing member in a suitable state owing to a deformation of the slip-out preventing member at the time of inserting the shaft after the molding of a housing, and a motor and electronic equipment, both including the bearing unit.

For achieving the above objects, a bearing unit according to the present invention is formed of a shaft, a radial bearing for supporting the shaft in a peripheral rotation direction of the shaft, a thrust bearing supporting an end of the shaft in a thrust direction of the shaft, a housing made of a molded body of a synthetic resin, inside of which housing the radial bearing and the thrust bearing are arranged, the housing having a sealed configuration except for a shaft insertion hole, through which the shaft is inserted, a slip-out preventing member provided on the side of an end of the radial bearing at which the thrust bearing is provided, the slip-out preventing member preventing the shaft from slipping out from the radial bearing, and a viscous fluid filled in the housing, wherein the slip-out preventing member is made of a material having a thermal deformation temperature higher than a temperature applied to the slip-out preventing member at the time of the molding of the housing.

As described above, in the bearing unit according to the present invention, because the slip-out preventing member is made of a material having the thermal deformation temperature higher than the temperature applied to the slip-out preventing member at the time of molding the housing, the deformation of the slip-out preventing member due to heat is prevented, and the occurrence of a defect of rotation caused by a contact of the slip-out preventing member with the shaft owing to the thermal deformation of the slip-out preventing member can be prevented. Moreover, the bearing unit according to the present invention can prevent the occurrence of a defect such as the impossibility of assembling the shaft and the slip-out preventing member in a suitable state at the insertion of the shaft into the housing after the molding thereof owing to the thermal deformation of the slip-out preventing member.

A motor according to the present invention, which motor is proposed for achieving the above-mentioned objects, is a motor equipped with a bearing unit supporting a rotor to a stator rotatably, and the motor uses the above-mentioned bearing unit as a bearing unit for the motor.

Electronic equipment according to the present invention, which equipment is proposed for achieving the above-mentioned objects, is electronic equipment equipped with a bearing unit supporting a rotor to a stator rotatably, and the electronic equipment uses the abovementioned bearing unit as a bearing unit for the electronic equipment.

According to the present invention, it is possible to prevent deformation of a slip-out preventing member due to the heat generated at the time of molding a housing.

Moreover, because the present invention prevents a slip-out preventing member from contacting with a rotation shaft due to a thermal deformation of the slipout preventing member, good rotation performance can be obtained.

Moreover, the present invention can prevent the generation of the defect of the impossibility or the like of assembling a shaft and a slip-out preventing member in a suitable state due to a thermal deformation of a slipout preventing member at the time of inserting the shaft after the molding of housing.

Moreover, because the present invention can solve a defect which may be produced in a conventional bearing unit by performing integral molding of a housing by means of the outsert molding, the present invention enables the outsert molding of the housing, and can prevent the ooze of viscous granules, such as a lubricating oil, from a joint portion of a housing obtained by the integral molding by the outsert molding.

The bearing unit to which the present invention is applied can not only be used as bearings of a motor of a heat radiator and a spindle motor of a disc drive, but also can be used as bearings of various motors.

Moreover, the application of the bearing unit to which the present invention is applied is not limited to the motor, but can be widely used for a mechanism equipped with a rotation shaft and a mechanism for supporting a rotating part.

PREFERRED EMBODIMENTS OF THE INVENTION

In the following, the attached drawings are referred to while an information processing apparatus to which the present invention is applied is described.

Figure 1:
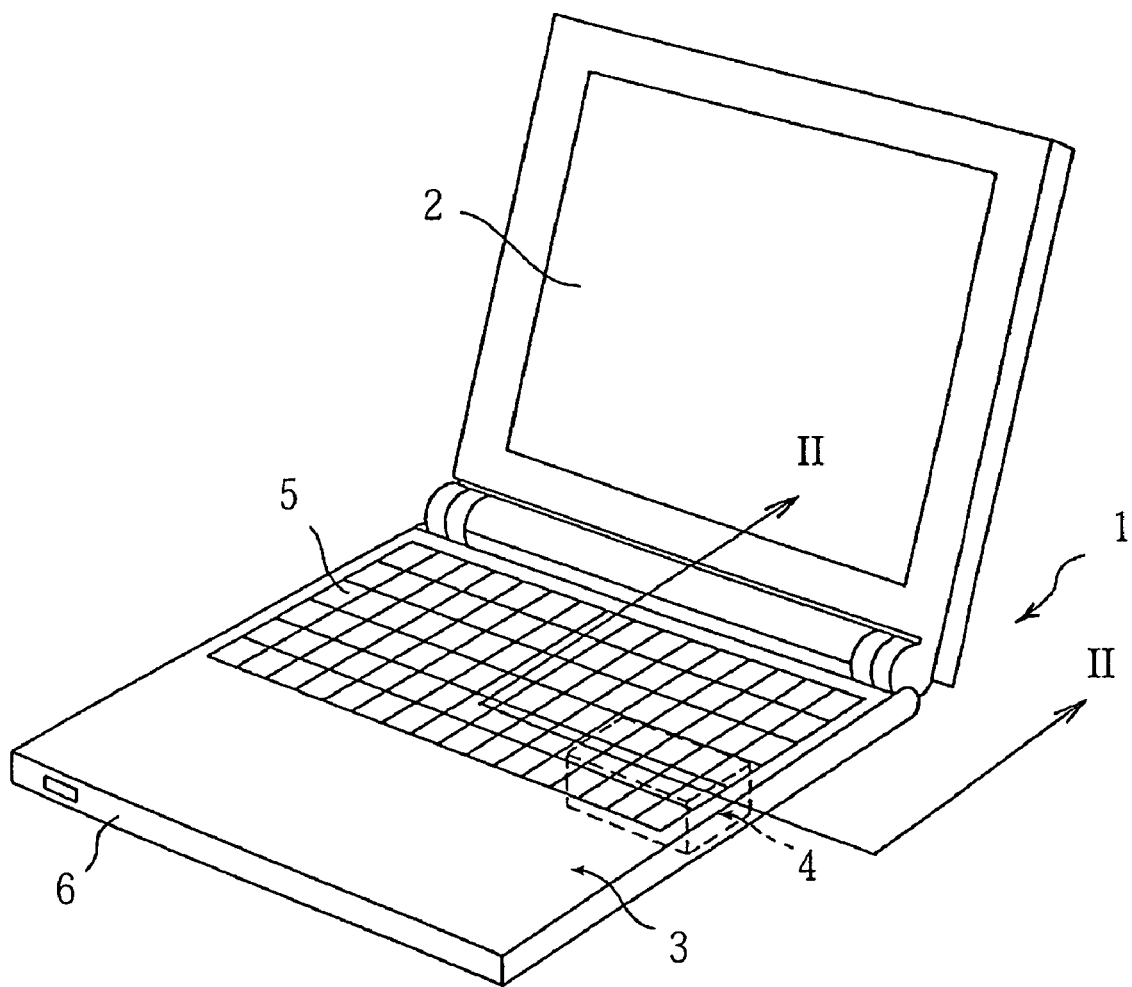
FIG. 1 is a perspective view showing an information processing apparatus to which the present invention is applied.

As shown in FIG. 1, the information processing apparatus to which the present invention is applied is a notebook-type personal computer including a display unit 2 for displaying a result of information processing and the like, and a computer main body 3 having built therein an information processing unit for performing the arithmetic processing of various pieces of information. A keyboard 5 for inputting an operating instruction of a computer 1 or for inputting various pieces of information is provided on the upper surface side of the computer main body 3, and a heat radiator 4 is provided in the inside of the main body 3. The heat radiator 4 radiates the heat generated by an information processing circuit such as a CPU arranged in the inside of the computer main body 3, or by a disc unit and the like to the outside of the computer main body 3 to function also as a cooling device for cooling the inside of the computer main body 3.

Figure 2:
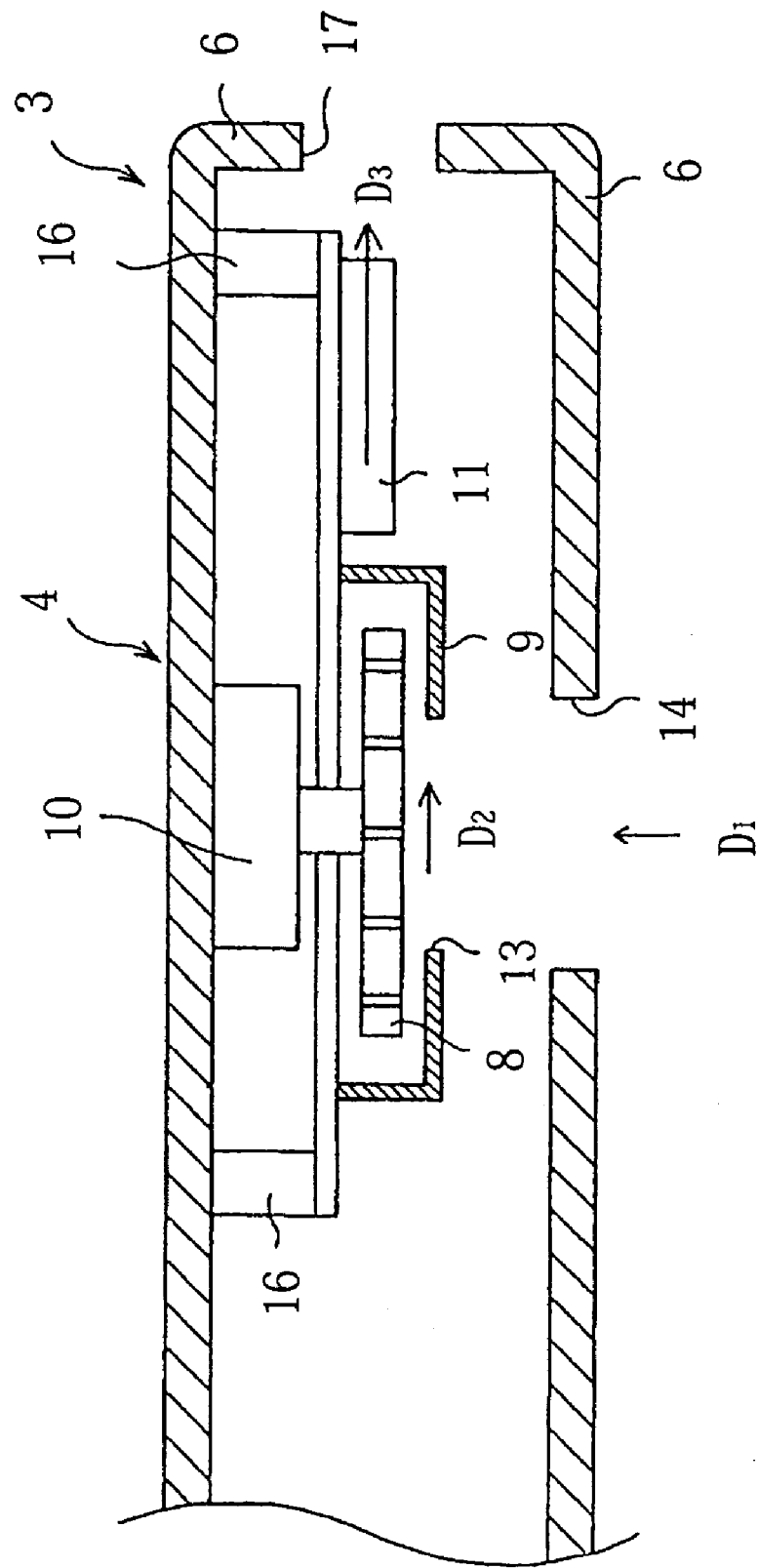
FIG. 2 is a sectional view showing the cross section taken along a line II-II in FIG. 1.
Figure 3:
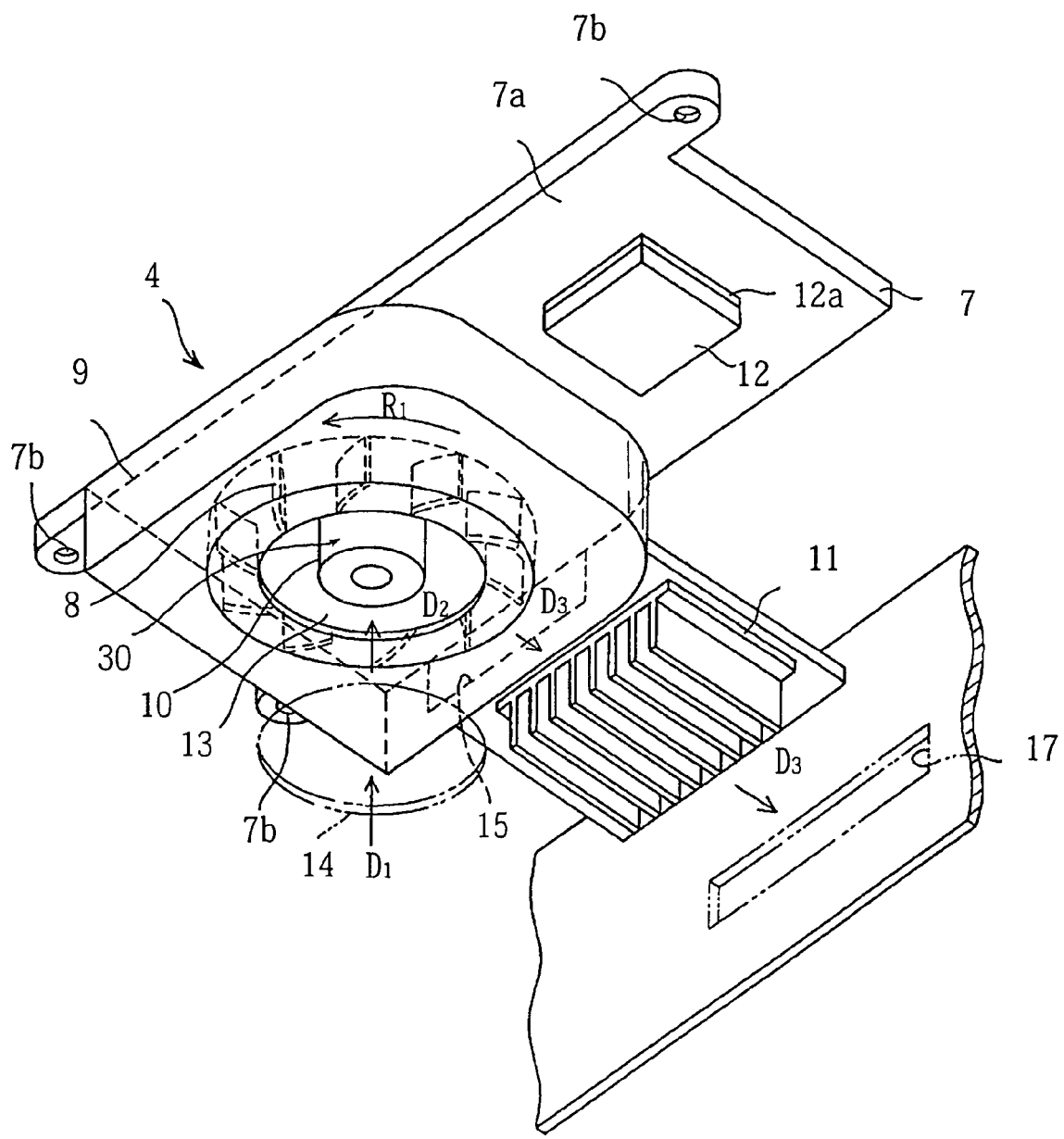
FIG. 3 is a perspective view showing a heat radiator using a motor to which the present invention is applied.

As shown in FIG. 2, the heat radiator 4 built in the computer main body 3 is housed in a housing 6 constituting the computer main body 3. As shown in FIG. 3, the heat radiator 4 includes a metal base 7, a motor 10 attached to the base 7, a fan 8 operated by the motor 10 to rotate, a fan case 9 housing the fan 8 therein, and a heat sink 11.

As shown in FIG. 3, the base 7 is formed almost in a letter L. A heating element 12 such as a central processing unit (CPU), which generates heat when driven by being turned on to conduct, is attached on one surface 7a on one end side of the base 7 formed almost in the letter L. The heating element 12 is attached on the side of the surface 7a of the base 7 on one side thereof with a heat transfer seal 12a put between them.

The motor 10 is attached almost at the central part on the side of the surface 7a of the base 7 on one side thereof, and also the fan case 9 accommodating therein the fan 8 operated by the motor 10 to rotate is attached on the surface 7a. A circular intake port 13 opening a position corresponding to the central part of the fan 8 rotated by the motor 10 is formed in the fan case 9. An opening 14 is formed to communicate with the intake port 13 at a position opposed to the intake port 13 formed in the fan case 9 on the side of the bottom surface of the housing 6. Moreover, an exhaust port 15 for exhausting the air absorbed through the intake port 13 to the outside is formed in the fan case 9.

The heat sink 11 is fixed on the surface 7a on one side on the other end side of the base 7. The heat sink 11 is a heat sink in a corrugated shape or a shape of fins, and is made of a metal having a property superior in heat radiation such as aluminum. It also is desirable to manufacture the base 7 and the fan case 9 from aluminum or iron, being metals superior in heat radiation.

A plurality of mounting holes 7b, through which screws used for attaching the base 7 into the housing 6 are inserted, is formed in the base 7, to which the heating element 12 is attached and the heat radiator 4 and the heat sink 11 for radiating the heat generated from the heating element 12 are attached. The base 7 is attached in the inside of the housing 6 by fixing the fixing screws inserted into the mounting holes 7b to bosses 16 provided in the inside of the housing 6, as shown in FIG. 2.

As shown in FIGS. 2 and 3, the heat sink 11 is arranged at a position opposed to a penetration hole 17 formed on a side face of the housing 6 when the base 7 is attached in the housing 6.

When the motor 10 is driven and the fan 8 is rotated in the direction of an arrow $R_1$ in FIG. 3 by the motor 10, the heat radiator 4 configured as described above absorbs the air on the outside of the apparatus into the direction of an arrow $D_1$ in FIGS. 2 and 3 though the opening 14 formed in the housing 6, and further the radiator 4 sucks the air in the inside of the fan case 9 through the intake port 13. The air sucked into the fan case 9 by the rotation of the fan 8 circulates into the direction of an arrow $D_2$ in FIGS. 2 and 3, and furthermore the air circulates into the direction of an arrow $D_3$ in FIG. 3 to flow in the heat sink 11. Then, the air is exhausted to the outside of the housing 6 through the penetration hole 17.

Now, the heat generated by the driving of the heating element 12 is transferred to the heat sink 11 through the base 7 formed of a metal superior in heat radiation. At this time, by the circulation of the air introduced from the outside of the housing 6 in the plurality of fins of the heat sink 11 by the rotation of the fan 8 of the heat radiator 4 with the motor 10, the air absorbs the heat transferred to the heat sink 11, and radiates the heat to the outside of the housing 6 through the penetration hole 17.

Figure 4:
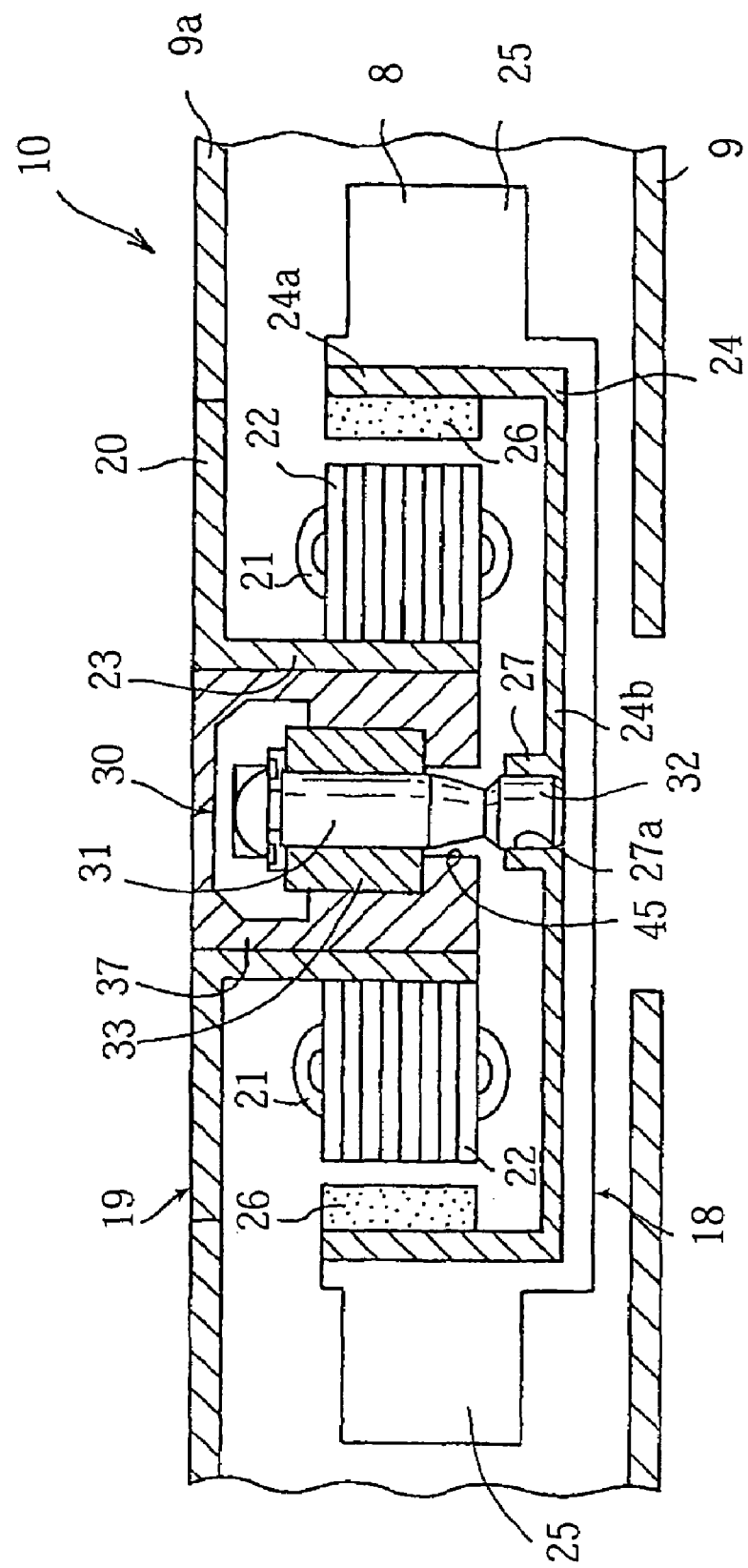
FIG. 4 is a sectional view showing a configuration of the motor to which the present invention is applied.

The motor 10, which the present invention is applied to and is used for the heat radiator, is provided with a rotor 18 and a stator 19, as shown in FIG. 4.

The stator 19 is integrally formed on the side of an upper surface plate 9a of the fan case 9, which accommodates the fan 8 rotated by the motor 10 therein together with the motor 10. The stator 19 is equipped with a stator yoke 20, a bearing unit 30 to which the present invention is applied, a coil 21 and a core 22, around which the coil 21 is wound. The stator yoke 20 may be one formed integrally with the upper surface plate 9a of the fan case 9, namely one made of a part of the fan case 9, or may be one formed independently of the fan case 9. The stator yoke 20 is formed of iron, for example. The bearing unit 30 is fixed in a holder 23 formed at the central part of the stator yoke 20 in the shape of a cylinder by press fitting, by adhesion, or by both press fitting and adhesion.

Incidentally, the holder 23, in which the bearing unit 30 is inserted by the press fitting, is formed integrally with the stator yoke 20 in a cylindrical shape.

As shown in FIG. 4, the core 22, around which the coil 21, to which a drive current is supplied, is wound, is attached on an outer peripheral portion of the holder 23 formed integrally with the stator yoke 20.

The rotor 18 constituting the motor 10 together with the stator 19 is attached to a rotation shaft 31 supported by the bearing unit 30 rotatably, and rotates integrally with the rotation shaft 31. The rotor 18 includes a rotor yoke 24 and the fan 8, which rotates integrally with the rotor yoke 24 and includes a plurality of fan blades 25. The fan blades 25 of the fan 8 are formed integrally with the rotor yoke 24 by outsert molding to the outer peripheral surface of the rotor yoke 24.

A ring-shaped rotor magnet 26 is provided on the inner peripheral surface of a cylinder portion 24a of the rotor yoke 24 in a manner of being opposed to the coil 21 of the stator 19. The magnet 26 is a plastic magnet, in which S poles and N poles are alternately magnetized in its peripheral rotation direction. The magnet 26 is fixed on an inner peripheral surface of the rotor yoke 24 with an adhesive.

The rotor yoke 24 is rotatably attached integrally with the rotation shaft 31 by the press fitting of a boss portion 27, where a through-hole 27a formed at the central part of a flat plate portion 24b is provided, to an attachment portion 32 formed at the tip side of the rotation shaft 31 supported by the bearing unit 30.

In the motor 10 having the configuration described above, when a drive current is supplied from a drive circuit unit provided on the outside of the motor 10 to the coil 21 on the side of the stator 19 in a predetermined energization pattern, the rotor 18 rotates integrally with the rotation shaft 31 by the influence of a magnetic field generated in the coil 21 and a magnetic field from the rotor magnet 26 on the side of the rotor 18. By the rotation of the rotor 18, the fan 8, which includes the plurality of the fan blades 25 and is attached to the rotor 18, also rotates integrally with the rotor 18. By the rotation of the fan 8, the air on the outside of the apparatus is sucked in the direction of the arrow $D_1$ in FIGS. 2 and 3 through the opening 14 formed in the housing 6, and circulates into the direction of the arrow $D_2$. While further circulating in the heat sink 11, the air is exhausted to the outside of the housing 6 through the penetration hole 17. Thereby, the heat generated by the heating element 12 is radiated to the outside of the computer main body 3, and then the inside of the computer main body 3 is cooled.

Figure 5:
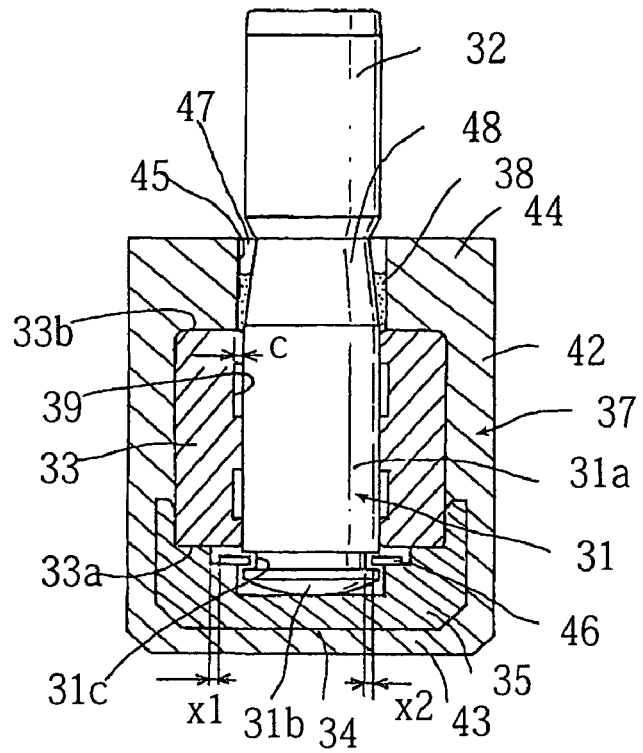
FIG. 5 is a sectional view showing a bearing unit to which the present invention is applied.

As shown in FIGS. 4 and 5, the bearing unit 30 supporting the rotation shaft 31 of the above-mentioned motor 10 rotatably is equipped with a radial bearing 33 supporting the rotation shaft 31 in its peripheral rotation direction, a space forming member 35, with which a thrust bearing 34 supporting one end of the rotation shaft 31 in a thrust direction is integrally formed, and a housing 37 having the radial bearing 33 and the space forming member 35 accommodated therein.

The radial bearing 33 is formed in a cylinder made of a sintered metal. The radial bearing 33 constitutes a fluid dynamic bearing together with a lubricating oil 38, being a viscous fluid filled in the housing 37, and dynamic pressure generating grooves 39 are formed on an inner peripheral surface of the radial bearing 33, in which the rotation shaft 31 is inserted.

Figure 6:
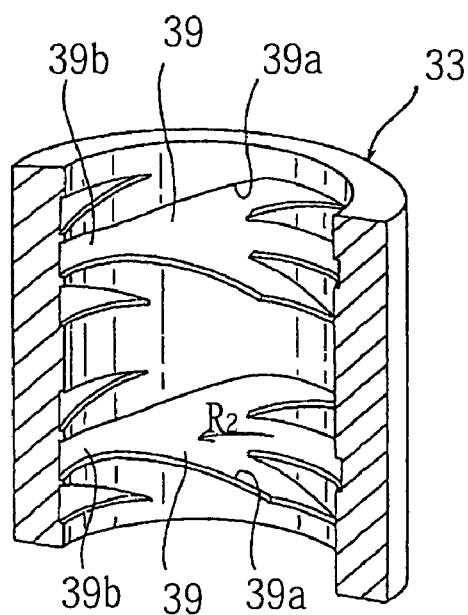
FIG. 6 is a perspective view showing dynamic pressure generating grooves formed on an inner peripheral surface of a radial bearing.

As shown in FIG. 6, the dynamic pressure generating grooves 39 are configured severally by forming a pair of V-shaped grooves 39a on the inner peripheral surface of the radial bearing 33 to be continuous in a peripheral rotation direction with a connection groove 39b. The dynamic pressure generating grooves 39 are severally formed in order that the tip side of the pair of V-shaped grooves 39a may face toward a rotation direction $R_2$ of the rotation shaft 31. In the present embodiment, the pair of dynamic pressure generating grooves 39 are formed to be arranged at an upper position and a lower position in the shaft direction of the radial bearing 33 shaped in a cylinder in parallel with each other. The number and the sizes of the dynamic pressure generating grooves formed on the radial bearing 33 are suitably selected according to the size, the length and the like of the radial bearing 33. Incidentally, the radial bearing 33 may be made of brass, stainless or a polymer material.

When the rotation shaft 31 inserted in the radial bearing 33 continuously rotates in the direction of the arrow $R_2$ (rotation direction) in FIG. 6 around a central axis CL (not shown), the lubricating oil 38 filled in the housing 37 circulates in the dynamic pressure generating grooves 39, and the radial bearing 33 formed as the fluid dynamic bearing generates a dynamic pressure between the outer peripheral surface of the rotation shaft 31 and the inner peripheral surface of the radial bearing 33 to support the rotation shaft 31. The dynamic pressure generated at this time extremely reduces a friction coefficient between the rotation shaft 31 and the radial bearing 33 to realize the smooth rotation of the rotation shaft 31.

As shown in FIG. 5, the space forming member 35 provided at one end side of the rotation shaft 31 in its thrust direction is formed to enclose the lower part of the rotation shaft 31, namely to enclose the end to be sealed. The space forming member 35 is made of, for example, a synthesis resin. On the inside of the space forming member 35, the lubricating oil is filled in the circumference of a bearing supporting portion 31b of the rotation shaft 31.

At the central part on an inner surface side of a bottom surface of the space forming member 35, the thrust bearing 34 is integrally formed. The thrust bearing 34 rotatably supports the bearing supporting portion 31b formed at the side of the end of the rotation shaft 31 in its thrust direction. The rotation shaft 31 is supported by the radial bearing 33. The space forming member 35 is made of a resin to be commonly used by the thrust bearing 34. The thrust bearing 34 is formed as a pivot bearing supporting the bearing supporting portion 31b, which is formed in an arc or a tapered point, of the rotation shaft 31 at a point.

It is noted that, although the space forming member 35 is made of a resin, the space forming member 35 may be made of a metal, or of a combination of a resin and a metal. The material of the space forming member 35 is not limited. For example, as a resin material used for the space forming member, a fluorine-series synthetic resin such as polyimide, polyamide and polyacetal, a synthetic resin such as polytetrafluoroethylene (Teflon (registered trademark)) and nylon, and a synthetic resin such as polycarbonate (PC) and acrylonitrile butadiene styrene (ABS) may be used.

As shown in FIG. 5, the housing 37 having the radial bearing 33 and the space forming member 35 accommodated therein has a shape housing and enclosing the radial bearing 33 and the space forming member 35, and is a member formed by the integral molding of a synthetic resin.

As shown in FIG. 5, the housing 37 is composed of a cylindrical housing main body 42, a bottom sealing portion 43 constituting one end side portion of the housing main body 42, which one end side is formed integrally with the housing main body 42 to seal the side of one end of the housing main body 42, and an upper sealing portion 44 formed integrally with the housing main body 42 to constitute the other end side of the housing main body 42. At the central part of the upper sealing portion 44, a shaft insertion hole 45, through which the rotation shaft 31 rotatably supported by the radial bearing 33 accommodated in the housing 37 is inserted, is formed.

In the housing 37 configured as described above, outsert molding of a synthetic resin material in a manner of wrapping the radial bearing 33 and the space forming member 35 allows a structure in which the radial bearing 33 and the space forming member 35 are arranged integrally on an internal circumference side of the housing main body 42.

The synthetic resin material configuring the housing 37 is not especially limited, but it is desirable to use a material that increases the contact angle to the lubricating oil 38, which indicates repelling to the lubricating oil 38 to be filled in the housing 37. Moreover, it is preferable to use a synthetic resin material having superior lubricity as the housing 37. For example, the housing 37 is made of polyoxymethylene (POM), but may be formed using a fluorine-series synthetic resin such as polyimide, polyamide and polyacetal, and a synthetic resin such as polytetrafluoroethylene (Teflon (registered trademark)) and nylon. Moreover, a synthetic resin such as polycarbonate (PC) and acrylonitrile butadiene styrene (ABS) may be used. Furthermore, the housing 37 may be made of a liquid crystal polymer, by which extremely accurate molding can be performed. In particular, in a case where the liquid crystal polymer is used as the housing 37, the housing 37 holds a lubricating oil, and has a superior abrasion resistance.

In the rotation shaft 31 rotatably supported by the radial bearing 33 arranged in the housing 37 and the thrust bearing 34 provided integrally with the housing 37, the bearing supporting portion 31b, which is supported by the thrust bearing 34, of a shaft main body 31a, is formed to be an arc or a tapered tip, and the attachment portion 32, to which, for example, the rotor 18 of the motor 10 being a rotation body is attached, is formed on the other end side of the rotation shaft 31. It is noted here that the shaft main body 31a and the attachment portion 32 are formed to have the same diameter.

As shown in FIG. 5, the rotation shaft 31 is supported by the housing 37 in a manner such that, the bearing supporting portion 31b on one end side thereof is supported by the thrust bearing 34, the outer peripheral surface of the shaft main body 31a is supported by the radial bearing 33, and the attachment portion 32 provided on the other side end protrudes from the shaft insertion hole 45 formed in the upper sealing portion 44 of the housing main body 42.

Moreover, in the rotation shaft 31, a groove portion 31c, which prevents the shaft from slipping out, is formed between the bearing supporting portion 31b and the shaft main body 31a. A washer 46 as a slip-out preventing member for the shaft is provided to the space forming member 35 correspondingly to the groove portion 31c for the slip-out prevention of the shaft. By the engagement of the groove portion 31c for the slip-out prevention of the shaft and the washer 46, handling at the time of assembly is improved.

The washer 46, which is the slip-out preventing member, is made of a material having a thermal deformation temperature higher than the temperature applied to the washer 46 at the time of integral molding of the housing with a synthetic resin. The material is, for example, polyetheretherketone (PEEK) or polyimide (PI). Moreover, to maintain the rotation performance of the rotation shaft 31, the size of the washer 46 is determined in order to be able to form a gap x1 between the space forming member 35 and the washer 46 and a gap x2 between the washer 46 and the rotation shaft 31.

Now, the shaft insertion hole 45 is formed to have an inner diameter slightly larger than the outer diameter of the shaft main body 31a to enable the rotation of the rotation shaft 31 inserted in the shaft insertion hole 45 without any slidable contact with the inner peripheral surface of the shaft insertion hole 45. In this case, the shaft insertion hole 45 is formed to include a gap 47 of a space c, which is sufficient for preventing the lubricating oil 38 filled between the inner peripheral surface of the insertion hole 45 and the outer peripheral surface of the shaft main body 31b in the housing 37 from leaking from the inside of the housing 37. The upper sealing portion 44, in which the shaft insertion hole 45 is formed to form the gap 47 preventing the leakage of the lubricating oil 38 filled between the shaft insertion hole 45 and the rotation shaft 31 in the housing 37, configures an oil seal portion.

Because the upper sealing portion 44, which is integrally formed with the housing 37, is made of a synthetic resin such as polyimide, polyamide or nylon, the contact angle of the inner peripheral surface of the shaft insertion hole 45 to the lubricating oil 38 can be made to be about 60 degrees. The bearing unit 30, to which the present invention is applied, includes the inner peripheral surface of the shaft insertion hole 45 constituting the oil seal portion, and can increase the contact angle of the lubricating oil 38 to the upper sealing portion 44 without coating any surface-active agents on the upper sealing portion 44. Consequently, the lubricating oil 38 can be prevented from moving to the outside of the housing 37 through the shaft insertion hole 45 by the centrifugal force generated by the rotation of the rotation shaft 31.

Moreover, a tapered portion 48 is formed on an outer peripheral surface of the rotation shaft 31 which is opposed to the inner peripheral surface of the shaft insertion hole 45. The tapered portion 48 inclines to enlarge the gap 47, which is formed between the outer peripheral surface of the rotation shaft 31 and the inner peripheral surface of the shaft insertion hole 45, to the outward of the housing 37. The tapered portion 48 forms a pressure gradient in the gap 47 formed by the outer peripheral surface of the rotation shaft 31 and the inner peripheral surface of the shaft insertion hole 45. Consequently, a force drawing the lubricating oil 38 filled in the housing 37 into the inside of the housing 37 is generated. Because the lubricating oil 38 is drawn into the inside of the housing 37 at the time of the rotation of the rotation shaft 31, the lubricating oil 38 surely permeates in the dynamic pressure generating grooves 39 of the radial bearing 33 composed of the fluid dynamic bearing to generate a dynamic pressure. Then, stable support of the rotation shaft 31 is realized, and leakage of the lubricating oil 38 filled in the housing 37 can be prevented.

Figure 7:
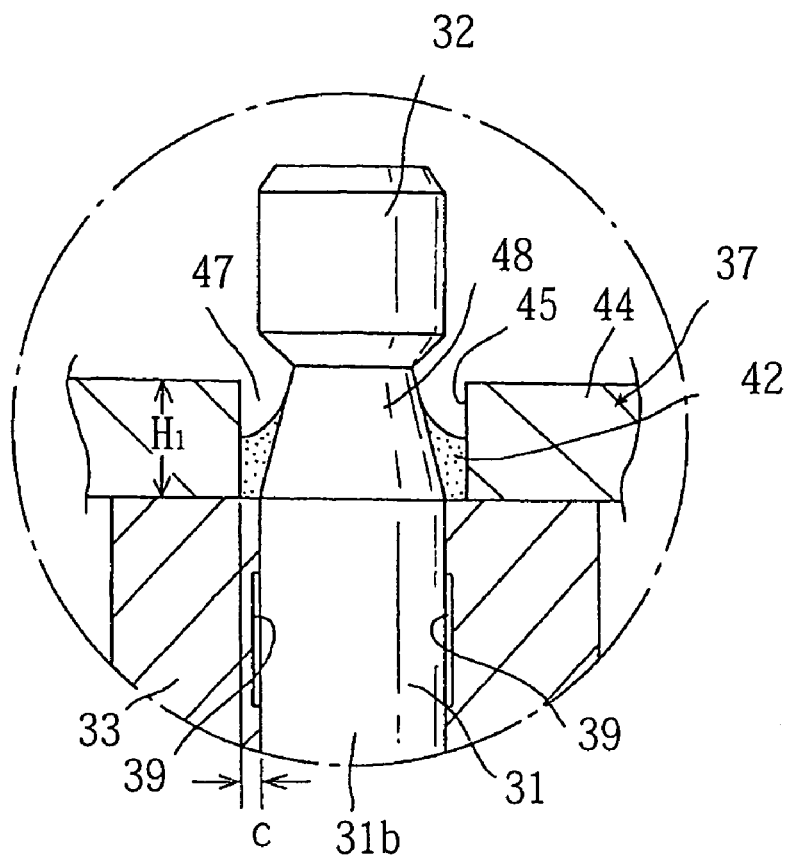
FIG. 7 is a sectional view showing a gap formed by an outer peripheral surface of a rotation shaft and an inner peripheral surface of a shaft insertion hole formed in a housing.

In the bearing unit 30, to which the present invention is applied, the lubricating oil 38, which permeates the dynamic pressure generating groove 39 provided in the radial bearing 33 constituting the fluid dynamic bearing and generates a dynamic pressure, is filled to face to the gap 47 from the inside of the housing 37, which gap 47 is formed by the tapered portion 48 formed on the rotation shaft 31 and the inner peripheral surface of the shaft insertion hole 45, as shown in FIGS. 5 and 7. That is to say, the lubricating oil 38 is filled in the gap in the housing 37, and is impregnated by the radial bearing 33 made of a sintered metal.

Now, the gap 47, which is formed between the tapered portion 48 formed on the rotation shaft 31 and the inner peripheral surface of the shaft insertion hole 45, is described. The minimum space of the gap 47 corresponds to the space c formed between the outer peripheral surface of the rotation shaft 31 and the inner peripheral surface of the shaft insertion hole 45. It is preferable that the space c is from 20 µm to 200 µm, and it is most preferable to be about 100 µm. if the space c is smaller than 20 µm, it is difficult to ensure molding accuracy of the housing 37 of the bearing unit 30 at the time of manufacturing the housing 37 with a synthetic resin by integral molding. If the space c of the gap 47 is larger than 200 µm, the impact resistance property of the bearing unit 30 decreases. The impact resistance property indicates a property of preventing the scattering of the lubricating oil 38 filled in the housing 37 to the outside of the housing 37 when an impact is applied to the bearing unit 30.

An impact resistance property G indicating the property of preventing the scattering of the lubricating oil 38 filled in the housing 37 to the outside of the housing 37 by an impact is expressed by the following equation (1):

$$G = (12\gamma \cos \beta / 2\rho c2)/g \tag{1}$$

where $\gamma$ indicates the surface tension of the lubricating oil, $\beta$ indicates the contact angle of the lubricating oil, $\rho$ indicates the density of the lubricating oil, c indicates the space between the rotation shaft and the shaft insertion hole, and g indicates the acceleration of free fall.

As shown in the equation (1), the impact resistance property G is inversely proportional to the square of the space c of the gap 47.

Moreover, an oil surface rising quantity h caused by thermal expansion is expressed by the following equation (2):

$$h = V\alpha\Delta t / 2\pi R c \tag{2}$$

where V indicates the lubricating oil filling quantity, $\alpha$ indicates the thermal expansion coefficient, $\Delta t$ indicates the temperature variation quantity, and R indicates the radius of a shaft.

As shown in the equation (2), because the oil surface rising quantity h is inversely proportional to the magnitude of the space c, the impact resistance property G is improved by narrowing the space c. However, the rise of the oil surface height h of the lubricating oil 38 caused by a rise of the temperature becomes steep, and consequently the thickness of the shaft insertion hole 45 in the shaft direction becomes necessarily thick.

As the result of a calculation, when the space c of the gap 47 formed between the rotation shaft 31 and the shaft insertion hole 45 is about 100 µm, and when the height $H_1$ of the shaft insertion hole 45, i.e. the thickness of the upper sealing portion 44 of the housing 37 is about 1 mm, in the bearing unit 30 including the rotation shaft 31 having a shaft diameter of from 2 mm to 3 mm, the impact resistance property of the bearing unit 30 is 1000 G or more, and the temperature resistance performance of the bearing unit 30 is 80° C. Consequently, it is possible to configure a highly reliable bearing unit 30 that prevents the scattering of the lubricating oil 38 filled in the housing 37.

Moreover, because the tapered portion 48 inclining in order to enlarge the space c of the gap 47 formed between the outer peripheral surface of the rotation shaft 31 and the inner peripheral surface of the shaft insertion hole 45 to the outward of the housing 37 is provided in the bearing unit 30, to which the present invention is applied, a pressure gradient is formed in the space c of the gap 47 formed between the outer peripheral surface of the rotation shaft 31 and the inner peripheral surface of the shaft insertion hole 45, and a force drawing the lubricating oil 38 filled in the housing 37 into the inside of the housing 37 is generated by the centrifugal force generated at the time of the rotation of the rotation shaft 31.

That is to say, in the bearing unit 30, to which the present invention is applied, the gap 47 formed between the outer peripheral surface of the rotation shaft 31 and the inner peripheral surface of the shaft insertion hole 45 prevents the scattering of the lubricating oil 38 by a surface tension seal.

Figure 8:
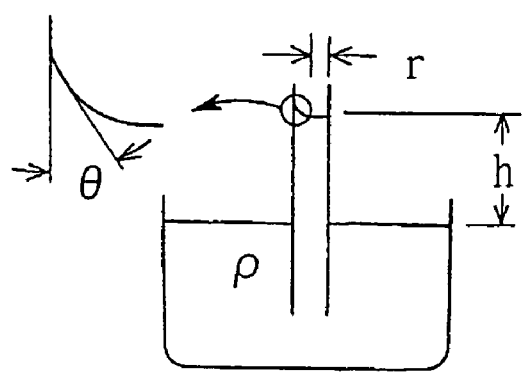
FIG. 8 is a view for illustrating a capillary phenomenon of a fluid.

Now, the surface tension seal is described. The surface tension seal is a seal method utilizing the capillary phenomenon of a fluid. The rise height hi of a liquid by a capillary tube as shown in FIG. 8 can be obtained as follows.

$$2\pi r \gamma \cos \theta = mg \tag{3}$$

where m is expressed by the following equation (4).

$$m = \pi r 2 h \rho \tag{4}$$

where m indicates the fluid mass in the tube within a range of h, r indicates the capillary tube radius, $\gamma$ indicates the surface tension of a viscous fluid, $\theta$ indicates the contact angle of the viscous fluid, $\rho$ indicates the density of the viscous fluid, and g indicates the gravitational acceleration.

From the equations (3) and (4), the following equation (5) is introduced.

$$h = 2\gamma \cos\theta / r\rho g \quad (5)$$

Generally, the relation between a pressure P and a fluid height is expressed by the following equation (6).

$$P = \rho g h \quad (6)$$

Here, from the equations (5) and (6), the pressure P can be obtained as an equation (7).

$$P = 2\gamma \cos\theta / r \quad (7)$$

In the equation (7), the pressure P means the drawing pressure drawing a fluid. From the equation (7), the thinner the capillary tube is, the larger the drawing pressure P is.

Figure 9:
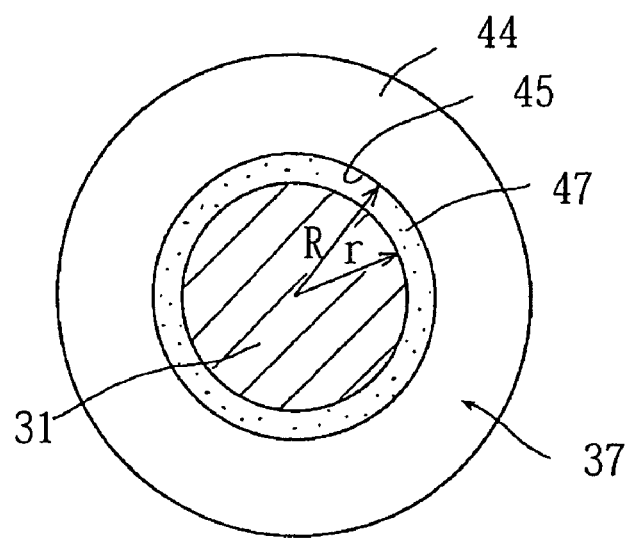
FIG. 9 is a transverse sectional view showing a state of a lubricating oil permeated into a gap formed between the outer peripheral surface of the rotation shaft and the inner peripheral surface of the shaft insertion hole.

The description described above concerns the equations in the case where the shape of a cross section of the capillary is a circle. However, in the bearing unit 30, to which the present invention is applied, the lubricating oil 38 permeated in the gap 47 formed between the outer peripheral surface of the rotation shaft 31 and the inner peripheral surface of the shaft insertion hole 45 is shaped to be a circular ring shown in FIG. 9. The rise height h1 of the lubricating oil 38 as a liquid in this case can be obtained as the following equation (8).

$$2\pi(R+r)\gamma \cos\theta = mg \quad (8)$$

where m is expressed by the following equation (9).

$$m = \pi(R^2 - r^2)h\rho \quad (9)$$

The following equation (10) can be obtained from the equations (8) and (9).

$$h1 = (2\gamma \cos\theta) / ((R-r)\rho g) \quad (10)$$

Supposing (R−r) is the space c of the gap 47 formed between the outer peripheral surface of the rotation shaft 31 and the inner peripheral surface of the shaft insertion hole 45, the equation (10) is modified to an equation (11).

$$h = (2\gamma \cos\theta) / (c\rho g) \quad (11)$$

Consequently, in a case where the shape of the cross section of the lubricating oil 38 is a circular ring, the drawing pressure is expressed by an equation (12).

$$P = 2\gamma \cos\theta / c \quad (12)$$

Now, concrete calculation examples are shown.

Supposing that the space c of the gap 47 formed between the outer peripheral surface of the rotation shaft 31 and the inner peripheral surface of the shaft insertion hole 45 is 0.02 cm (0.2 mm), the surface tension γ of the viscous fluid is 30 dyn/cm$^2$, and the contact angle θ of the lubricating oil 38 is 15°, then the drawing pressure is $2.86 \times 10^{-3}$ atmospheres from an equation (13).

$$P = 2 \times 30 \times \cos 15° / 0.05 \quad (13)$$
$$= 3.00 \times 10^3 \text{ dyn/cm}^2$$
$$= 2.86 \times 10^{-3} \text{ (atm)}$$

From equation (12), the narrower the space c of the gap 47 is, the larger the drawing pressure P is. Consequently, the formation of the tapered portion 48 on the rotation shaft 31 enables the lubricating oil 38 as the viscous fluid to be drawn into the narrower direction of the space c of the gap 47, i.e. the inside direction of the housing 37.

Figure 10:
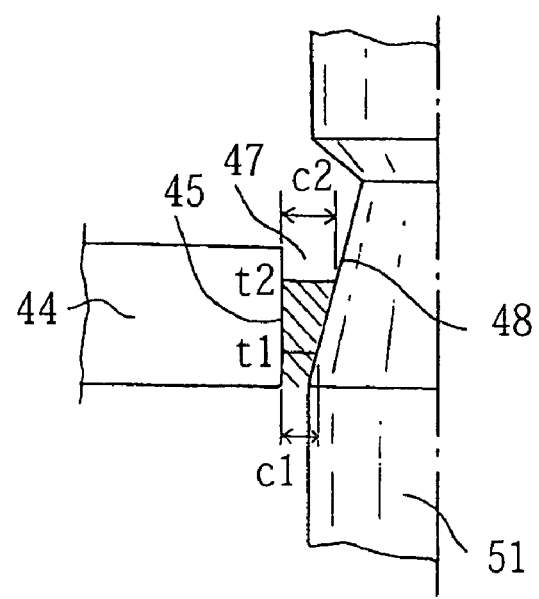
FIG. 10 is a longitudinal sectional view showing the gap formed between the outer peripheral surface of the rotation shaft and the inner peripheral surface of the shaft insertion hole, which view is used for describing differences of drawing pressures at different diameter parts of a tapered portion formed on the rotation shaft.

For example, as shown in FIG. 10, the relation between drawing pressures P1 and P2 at portions t1 and t2, where the diameters of the tapered portion 48 formed on the rotation shaft 31 are different from each other, is P1>P2 from the equation (12) because the relation between a space c1 between the outer peripheral surface of the rotation shaft 31 and the inner peripheral surface of the shaft insertion hole 45 at the t1 portion and a space c2 between the outer peripheral surface of the rotation shaft 31 and the inner peripheral surface of the shaft insertion hole 45 at the t2 portion is c1<c2. Consequently, it is known that the drawing pressure P of the lubricating oil 38 into the inside of the housing 37 increases as the space c of the gap 47 formed between the outer peripheral surface of the rotation shaft 31 and the inner peripheral surface of the shaft insertion hole 45 is narrower.

By thus forming the tapered portion 48, by which the space c of the gap 47, which is formed between the outer peripheral surface of the rotation shaft 31 and the inner peripheral surface of the shaft insertion hole 45 and constitutes the seal portion for preventing the leakage of the lubricating oil 38 filled in the housing 37 to the outside of the housing 37, becomes smaller toward the inside of the housing 37, a pressure gradient is produced in the lubricating oil 38 positioned in the gap 47 formed between the outer peripheral surface of the rotation shaft 31 and the inner peripheral surface of the shaft insertion hole 45. That is to say, the pressure gradient given to the lubricating oil 38 increases toward the inside of the housing 37, where the space c of the gap 47 becomes smaller. By the generation of the pressure gradient in the lubricating oil 38, the pressure P drawing in the lubricating oil 38 toward the inside of the housing 37 always operates on the lubricating oil 38. Consequently, even in a case where the rotation shaft 31 rotates, air is not involved into the lubricating oil 38 existing in the gap 47.

Figure 11:
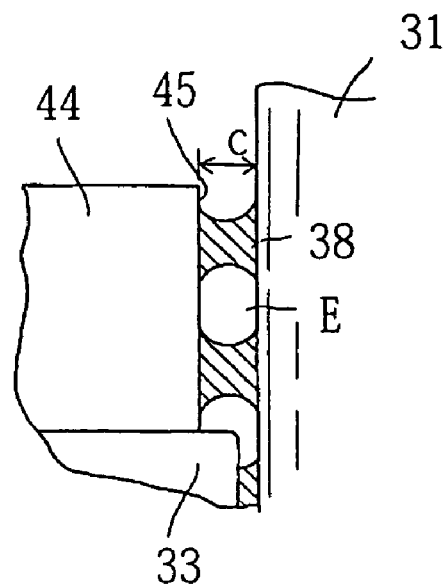
FIG. 11 is a longitudinal sectional view showing a state in which air is involved into the lubricating oil permeated in the gap formed between the outer peripheral surface of the rotation shaft and the inner peripheral surface of the shaft insertion hole.

In a case where the tapered portion 48 described above is not formed, namely in a case where the space c of the gap 47 formed between the outer peripheral surface of the rotation shaft 31 and the inner peripheral surface of the shaft insertion hole 45 is constant in the height direction of the shaft insertion hole 45 as shown in FIG. 11, no pressure gradients are generated in the lubricating oil 38 permeated in the gap 47 between the outer peripheral surface of the rotation shaft 31 and the inner peripheral surface of the shaft insertion hole 45. Consequently, the lubricating oil 38 uniformly exists in the gap 47. That is to say, by narrowing the space c between the outer peripheral surface of the rotation shaft 31 and the inner peripheral surface of the shaft insertion hole 45, the lubricating oil 38, which is permeated in the gap 47 and functions as the seal portion, sometimes moves in the gap 47 at the time of the rotation of the rotation shaft 31 to involve air E. If the air E is involved in the lubricating oil 38 as mentioned above, the air expands owing to a temperature change, an atmospheric pressure change and the like, and the expanded air scatters the lubricating oil 38 from the gap 47 constituting the seal portion to the outside of the housing 37.

On the contrary, by the formation of the tapered portion 48, at which the space c of the gap 47 formed between the outer peripheral surface of the rotation shaft 31 and the inner peripheral surface of the shaft insertion hole 45 becomes smaller toward the inside of the housing 37 like the bearing unit 30 to which the present invention is applied, the pressure gradient which makes the pressure larger toward the inside of the housing 37 is generated in the lubricating oil 38 permeated in the gap 47. Consequently, the air E can be prevented from being involved in the lubricating oil 38 when the rotation shaft 31 rotates.

Moreover, the formation of the tapered portion 48 as described above can not only prevent the scattering of the lubricating oil 38 permeated in the gap 47 formed between the outer peripheral surface of the rotation shaft 31 and the inner peripheral surface of the shaft insertion hole 45 to the outward of the housing 37 at the time when the rotation shaft 31 is eccentric to the shaft insertion hole 45 formed in the housing 37, but it also can permeate the lubricating oil 38 over the whole circumference of the rotation shaft 31, and can prevent the exhaustion of the lubricating oil 38 in the circumference of the rotation shaft 31 to ensure stable rotation of the rotation shaft 31.

Figure 12:
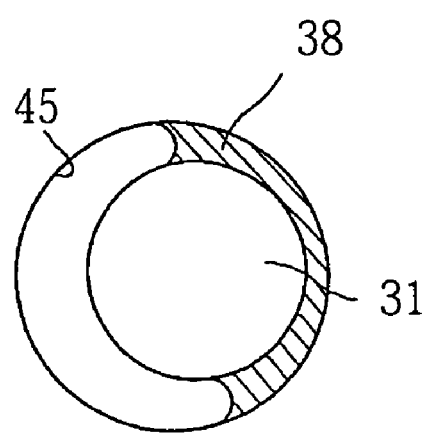
FIG. 12 is a transverse sectional view showing a state in which the lubricating oil permeated in the gap formed between the outer peripheral surface of the rotation shaft and the inner peripheral surface of the shaft insertion hole is cut.

In a case where the tapered portion 48 mentioned above is not formed, when the rotation shaft 31 is inclined with regard to the shaft insertion hole 45 provided in the housing 37, the lubricating oil 38 concentrates to the narrower part of the space c between the outer peripheral surface of the rotation shaft 31 and the inner peripheral surface of the shaft insertion hole 45, and the lubricating oil 38 is cut to involve the air E at the wider portion of the space c on the opposite side, as shown in FIG. 12. When the air E is involved in the lubricating oil 38, the air E expands owing to a temperature change, an atmospheric change or the like, and the lubricating oil 38 is scattered from the gap 47 constituting the seal portion to the outside of the housing 37.

Figure 13:
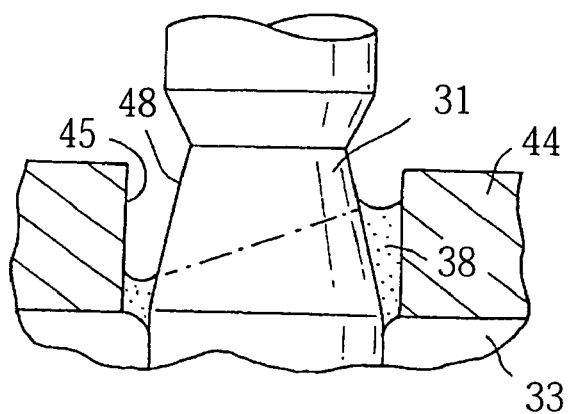
FIG. 13 is a longitudinal sectional view showing a state in which the rotation shaft is inclined with regard to the shaft insertion hole formed in the housing.
Figure 14:
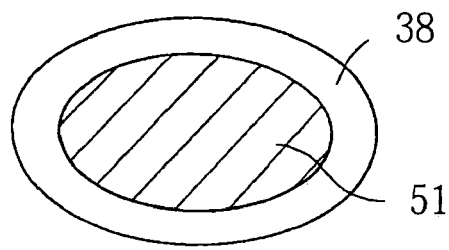
FIG. 14 is a sectional view showing a state of the lubricating oil permeated in the gap when the rotation shaft is inclined with regard to the shaft insertion hole formed in the housing.

On the contrary, by forming the tapered portion 48 on the rotation shaft 31 like the bearing unit 30, to which the present invention is applied, even when the rotation shaft 31 is inclined with regard to the shaft insertion hole 45 formed in the housing 37, the gap 47 of the same space c always exists on an elliptical orbit along which the inclined rotation shaft 31 rotates, as shown in FIG. 13, and the space c of the gap 47 formed on the outer peripheral surface of the rotation shaft 31 and the inner peripheral surface of the shaft insertion hole 45 on the elliptical orbit is constant over the whole circumference of the rotation shaft 31 as shown in FIG. 14. Consequently, the phenomenon in which the lubricating oil 38 concentrates to the narrower side of the space c does not occur, and then it becomes possible to prevent the discharge of the lubricating oil 38 from the gap 47, and, eventually, to prevent the discharge of the lubricating oil 38 from the housing 37.

Figure 15:
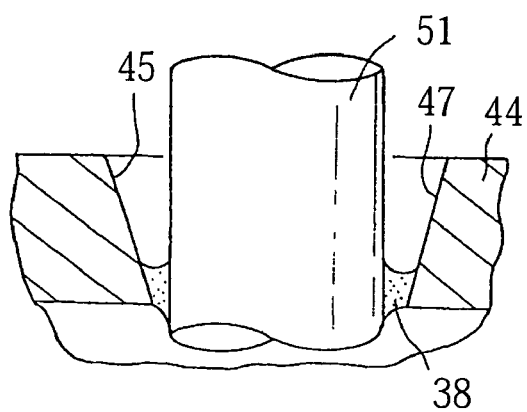
FIG. 15 is a sectional view showing another example of a bearing unit to which the present invention is applied, in which a tapered portion is formed on the side of the shaft insertion hole formed in the housing.

Although the tapered portion 48 is formed on the side of the rotation shaft 31 in the above-mentioned bearing unit 30, the tapered portion 48 may be formed on the inner peripheral surface of the shaft insertion hole 45 on the side of the housing 37, as shown in FIG. 15.

A process for manufacturing the bearing unit 30, which is configured as described above and to which the present invention is applied, is described.

Figure 16:
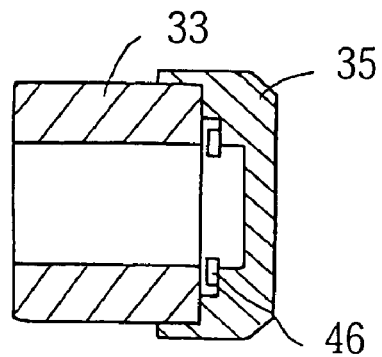
FIG. 16 is a view for illustrating a process of temporary assembly in a process for manufacturing a bearing unit to which the present invention is applied.

For manufacturing the bearing unit 30, to which the present invention is applied, the space forming member 35 is attached to the side of one end of the outside of the radial bearing 33 to assemble the space forming member 35 and the radial bearing 33 temporarily. At the time of the temporary assembly of the radial bearing 33 and the space forming member 35, the washer 46 being the shaft slip-out preventing means of the rotation shaft 31 is attached to the rotation shaft 31, as shown in FIG. 16. Next, the space forming member 35 is attached to the radial bearing 33 which is the fluid dynamic bearing.

Figure 17:
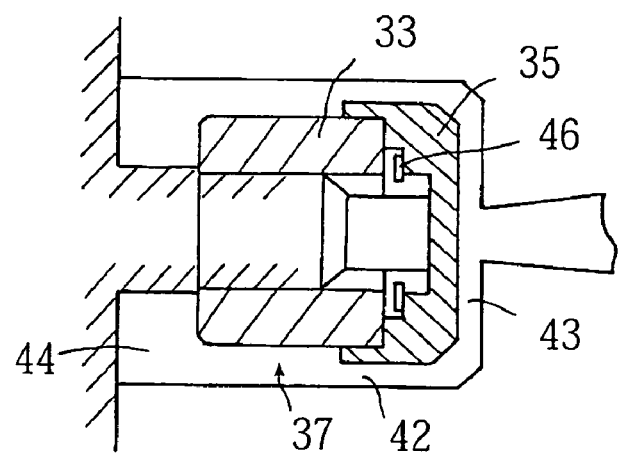
FIG. 17 is a view for illustrating a process of outsert molding of a housing in the process for manufacturing the bearing unit, to which the present invention is applied.

Next, the radial bearing 33 and the space forming member 35, which have been temporarily assembled, are attached to a die. As shown in FIG. 17, the outsert molding of the temporary assembled radial bearing 33 and the space forming member 35 at their outer circumferences with any one of the synthetic resins mentioned above is performed to form the housing 37. At this time, the radial bearing 33 and the space forming member 35 are integrated in the inside of the housing 37, and are held by being nipped by the upper sealing portion 44 and the bottom sealing portion 43, which are integrally formed at the upper position and the lower position of the cylindrical housing main body 42, for fixing the attachment positions of the radial bearing 33 and the space forming member 35 at the time when the outsert molding of the housing 37 is performed.

In this case, there are no occasions of inflow of the synthetic resin into the space between the space forming member 35 and the radial bearing 33 at the time of the outsert molding of the housing 37 because of the interception by the space forming member 35.

The die temperature at the time of the outsert molding of the housing 37 in a case where the housing 37 is made of polyoxymethylene (POM) is 60 to 100° C., and the resin temperature is 200° C. The heat generated at the time of the molding conducts to the washer 46 through the radial bearing 33 and the space forming member 35, and the temperature of the washer 46 becomes about 120° C. Hereupon, because the washer 46 is made of a material having a thermal deformation temperature higher than the temperature 120° C., which is applied to the washer 46 by the molding temperature, i.e. polyetheretherketone (PEEK), a polyimide resin (PI) or the like, the washer 46 does not thermally deform.

Figure 18:
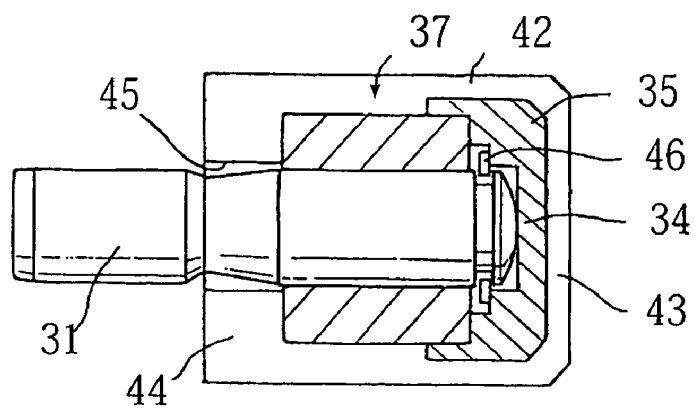
FIG. 18 is a view for illustrating a process of inserting the rotation shaft into the housing in the process for manufacturing the bearing unit to which the present invention is applied.
Figure 19:
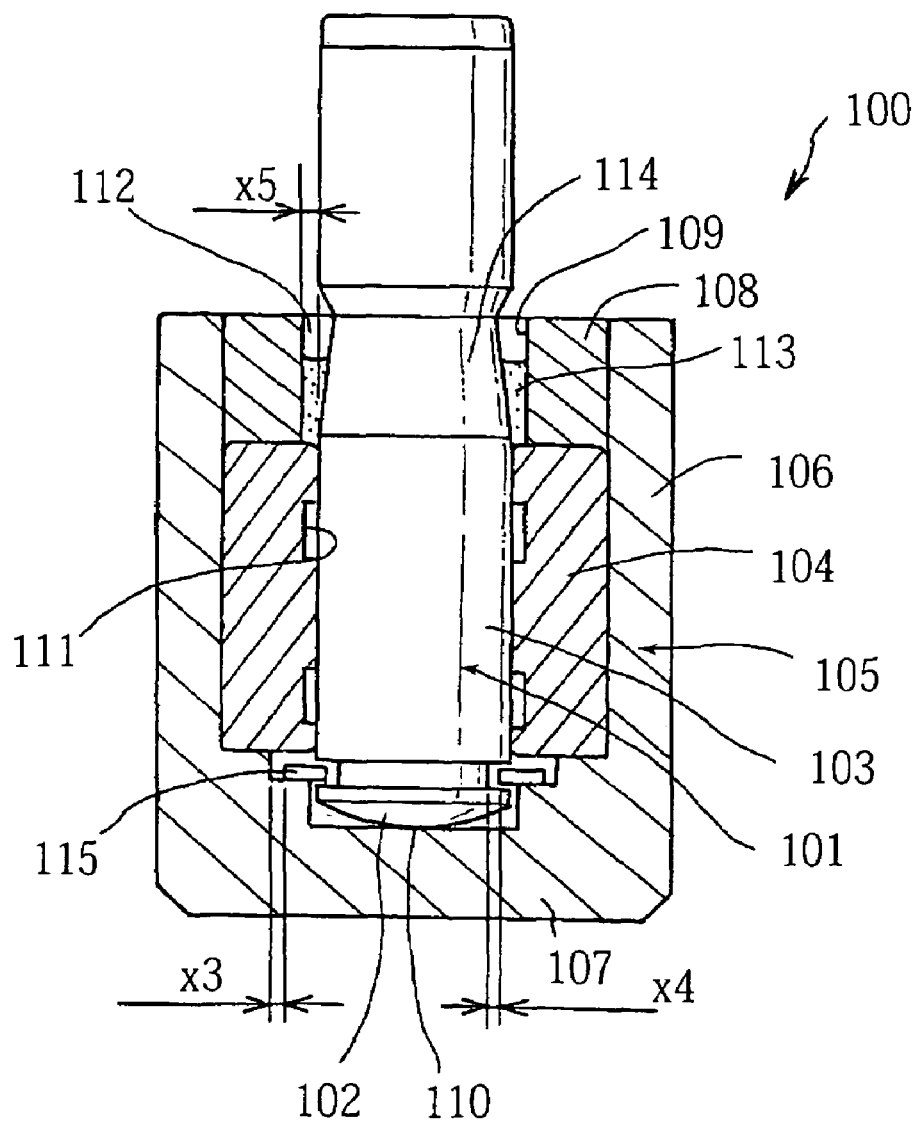
FIG. 19 is a sectional view showing a bearing unit which has been conventionally used.
Figure 20:
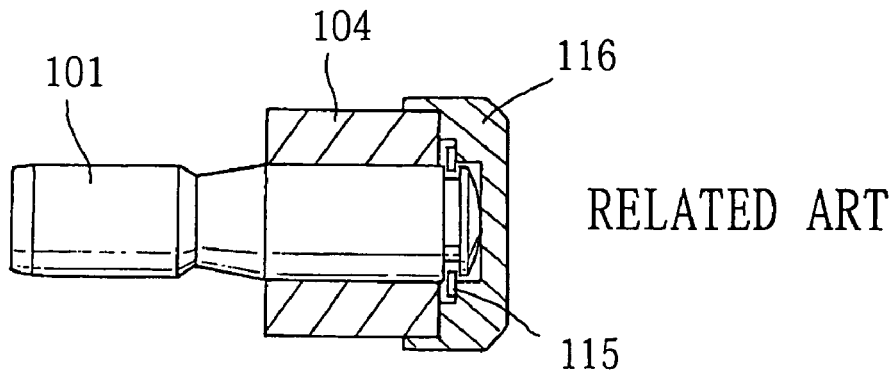
FIG. 20 is a view for illustrating a process of temporary assembly in the process for manufacturing the bearing unit which has been conventionally used.
Figure 21:
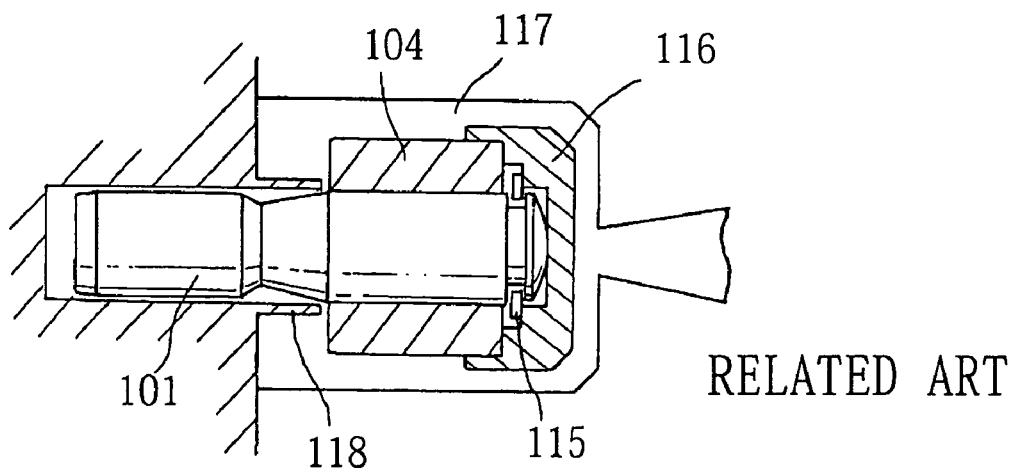
FIG. 21 is a view for illustrating a process of outsert molding of a housing in the process for manufacturing the bearing unit which has been conventionally used.
Figure 22:
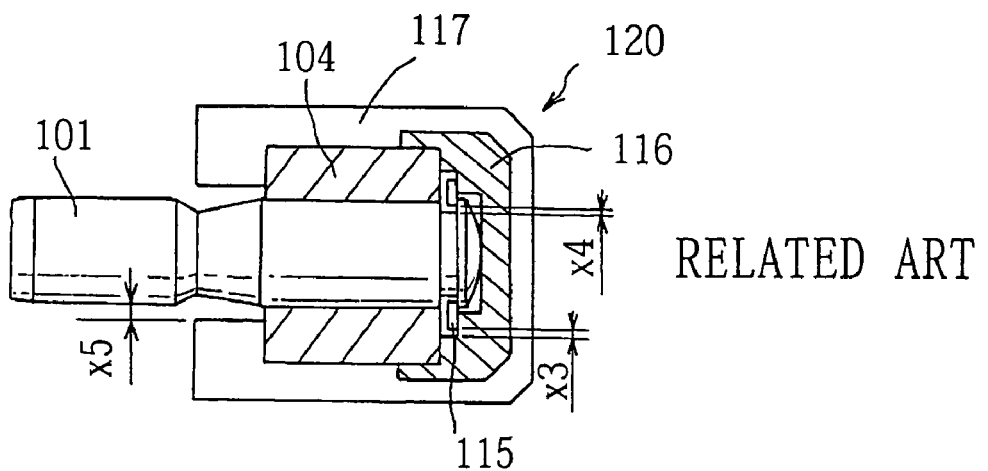
FIG. 22 is a view showing a state where the outsert molding of the housing is completed in the process for manufacturing the bearing unit which has been conventionally used.

Next, as shown in FIG. 18, the rotation shaft 31 is inserted into the shaft insertion hole 45 formed in the upper sealing portion 44 to insert the rotation shaft 31 into the housing 37. At this time, the rotation shaft 31 is inserted into the radial bearing 33 with the bearing supporting portion 31b being abutted against the thrust bearing 34 for being inserted into the housing 37. The rotation shaft 31 supported by the thrust bearing 34 and the radial bearing 33 is rotatably supported in the housing 37. When the rotation shaft 31 is inserted into the housing 37, the washer 46 arranged in the space forming member 35 is pushed to the bearing supporting portion 31b to bend in the thrust direction, and consequently the washer allows the bearing supporting portion 31b to be inserted. When the bearing supporting portion 31b has been inserted in the washer 46 and the groove portion 31c for the slip-out prevention of the shaft has been positioned at the inside of the washer 46, the rotation shaft 31 is attached in the inside of the housing 37. At this time, the bending of the washer 46 is eliminated, and the washer 46 becomes its normal shape. The washer 46 functions as a slip-out preventing member for preventing the rotation shaft 31 from slipping out of the inside of the housing. Moreover, because the washer 46 does not thermally deform at the time of the abovementioned outsert molding, the rotation shaft 31 can be assembled in a suitable state when it is inserted.

When the rotation shaft 31 has been inserted into the housing 37, the lubricating oil 38 is filled in the housing 37. The filling of the lubricating oil 38 is performed by throwing the housing 37 with the rotation shaft 31 inserted therein into a not shown filling bath containing a lubricating oil therein. Next, the filling bath, into which the housing has been thrown, is absorbed to be a vacuum by a vacuum apparatus. After that, by taking out the filling bath, which has been absorbed to be a vacuum, into the air, the lubricating oil 38 is filled into the housing 37.

At this time, the lubricating oil 38 is filled in order that the lubricating oil 38 may not leak from the inside of the shaft insertion hole 45 to the outside of the housing 37 when the lubricating oil 38 expands owing to a temperature change, or in order that a shortage of the filling of the lubricating oil 38 into the gap 47 formed between the rotation shaft 31 and the shaft insertion hole 45 may not occur when the lubricating oil 38 contracts owing to a temperature change. That is to say, changes of the oil surface height of the lubricating oil 38 owing to temperature changes are set to be within a range of the inside of the shaft insertion hole 45.

By filling the lubricating oil 38 into the housing 37 by means of vacuum absorption using the vacuum apparatus, the pressure inside the housing 37 is in a state of being lower than that outside the housing 37. As a result, lubricating oil 38 leaks from the housing 37 can be easily prevented.

Because, in the bearing unit 30 to which the present invention is applied, the radial bearing 33 is made of sintered metal, the lubricating oil 38 is filled in the radial bearing 33, and the lubricating oil 38 is also filled in the dynamic pressure generating grooves 39 generating a dynamic pressure owing to the rotation of the rotation shaft 31. That is to say, the lubricating oil 38 is filled in all of the gaps in the housing 37.

Although the above-mentioned bearing unit forms the housing as a molded body of a synthetic resin, the material of the bearing unit is not limited to the synthetic resin. A synthetic resin in which a metal material capable of being molded with a mold assembly is mixed or other molding materials may be used for forming the bearing unit. Incidentally, there is a case where the contact angle of the lubricating oil filled in the housing with regard to the inner peripheral surface of the shaft insertion hole cannot be sufficiently maintained when the housing is made of a material other than synthetic resin. In such a case where there is the possibility that the contact angle of the lubricating oil cannot be maintained at a large angle; the contact angle may be increased by coating a surface active agent on the inner peripheral surface of the shaft insertion hole, or on the outer peripheral surface of the upper sealing portion including the inner peripheral surface of the shaft insertion hole.

Because, in the bearing unit 30 configured as described above, the slip-out preventing member is made of a material having a thermal deformation temperature higher than the temperature applied to the slip-out preventing member when the housing is molded, the slip-out preventing member can be prevented from being thermally deformed. Consequently, the bearing unit 30 can prevent the contact of the slip-out preventing member to the rotation shaft owing to the thermal deformation of the slip-out preventing member, and a good rotation performance can be obtained. Moreover, the bearing unit 30 can prevent the generation of a defect of the impossibility of the assembly of the thermally deformed slip-out preventing member and the shaft to be inserted after the molding of the housing, in a suitable state. As described above, when the housing is integrally formed by the outsert molding, the bearing unit 30 can maintain a good lubricating performance by the outsert molding without oozing of the lubricating oil. Moreover, because the thermal deformation of the slip-out preventing member caused by the outsert molding is prevented, a good rotation property can be obtained.

What is claimed is:

1. A bearing unit comprising:
   a shaft adapted to rotate in a peripheral rotation direction;
   a housing, said housing being a molded body to enclose a radial bearing and a space forming member, said radial bearing supporting a medial portion of said shaft, and said space forming member enclosing a distal end of said shaft; and
   a slip-out preventing member between said radial bearing and said space forming member, said shaft extending through said slip-out preventing member,
   wherein said slip-out preventing member is made of a material having a thermal deformation temperature higher than a temperature applied to said slip-out preventing member at the time of the molding of said housing,
   wherein said space forming member is composed of a resin,
   wherein said slip-out preventing member is made of a synthetic resin.

2. A bearing unit comprising:
   a shaft adapted to rotate in a peripheral rotation direction, a radial bearing supporting a medial portion of said shaft;
   a housing adapted to enclose said radial bearing and a space forming member, said space forming member enclosing a distal end of said shaft;
   a slip-out preventing member made of a plastic, said plastic having a thermal deformation temperature higher than a temperature applied to said slip-out preventing member at the time of the molding of said housing.

3. The bearing unit according to claim 2, wherein said slip-out preventing member is between said radial bearing and said space forming member, said shaft extending through said slip-out preventing member.

4. The bearing unit according to claim 2, further comprising:
   a viscous fluid filled in said housing.

5. The bearing unit according to claim 2, further comprising:
   a thrust bearing supporting said distal end of said shaft.

6. The bearing unit according to claim 2, wherein said housing includes a shaft insertion hole, said shaft extending through said shaft insertion hole.

7. The bearing unit according to claim 6, wherein a gap is between said shaft and said shaft insertion hole, the minimum space of said gap being from 20μm to 200μm.

8. The bearing unit according to claim 2, wherein said housing is composed of a synthetic resin.

9. The bearing unit according to claim 2, wherein said housing is composed of polyoxymethylene.

10. The bearing unit according to claim 2, wherein said housing is composed of a material from the group consisting of polyimide, polyamide and polyacetal.

11. The bearing unit according to claim 2, wherein said housing is composed of a material from the group consisting of polytetrafluoroethylene and nylon.

12. The bearing unit according to claim 2, wherein said housing is composed of a material from the group consisting of polycarbonate and acrylonitrile butadiene styrene.

13. The bearing unit according to claim 2, wherein said housing is composed of a liquid crystal polymer.

14. The bearing unit according to claim 2, wherein said slip-out preventing member is composed of a polyetheretherketone.

15. The bearing unit according to claim 2, wherein said slip-out preventing member is composed of a polyimide.

16. The bearing unit according to claim 2, wherein at least one dynamic pressure generating groove is formed on an inner peripheral surface of said radial bearing, said dynamic pressure generating groove being a V-shaped groove, a tip side said V-shaped groove facing toward said peripheral rotation direction.

17. The bearing unit according to claim 2, wherein said radial bearing is composed of brass.

18. The bearing unit according to claim 2, wherein said radial bearing is composed of a polymer material.

19. The bearing unit according to claim 2, wherein the space forming member is composed of a combination of a resin and a metal.

20. The bearing unit according to claim 2, wherein said space forming member is composed of a material from the group consisting of polyimide, polyamide and polyacetal.

21. The bearing unit according to claim 2, wherein said space forming member is composed of a material from the group consisting of polytetrafluoroethylene and nylon.

22. The bearing unit according to claim 2, wherein said space forming member is composed of a material from the group consisting of polycarbonate and acrylonitrile butadiene styrene.

23. A motor equipped with the bearing unit of claim 2 rotatably supporting a rotor with regard to a stator.

24. Electronic equipment equipped with one or more motors, said one or more motors having the bearing unit of claim 2 rotatably supporting a rotor with regard to a stator.

* * * * *